United States Patent [19]
Wicke et al.

[11] 3,991,172
[45] Nov. 9, 1976

[54] PROCESS FOR THE PRODUCTION OF REACTIVE CALCIUM OXIDE

[75] Inventors: Ewald Wicke, Munster; Josef Wuhrer, Wulfrath both of Germany

[73] Assignee: Rheinische Kalksteinwerke GmbH, Wulfrath, Germany

[22] Filed: Jan. 4, 1974

[21] Appl. No.: 430,652

Related U.S. Application Data

[63] Continuation of Ser. No. 144,454, May 18, 1971, abandoned.

[30] Foreign Application Priority Data

May 20, 1970 Germany............................ 2024471

[52] U.S. Cl............................. 423/637; 423/175; 423/177
[51] Int. Cl.²..................... C01F 11/02; C01B 13/14
[58] Field of Search ........... 423/175, 176, 177, 637; 263/53; 75/9

[56] References Cited
UNITED STATES PATENTS 2,774,661   12/1956   White ........................................ 75/9
3,271,015   1/1963   Mahony ............................. 263/53 R

FOREIGN PATENTS OR APPLICATIONS 256,687    8/1926   United Kingdom
1,102,790   2/1968   United Kingdom

OTHER PUBLICATIONS

E. Cremer, "The Influence of the Pressure of $CO_2$ on the Rate of Decomposition of $CaCO_3$", Z. Electrochem; 66 pp. 697–702 (1962).

*Primary Examiner*—Peter D. Rosenberg
*Attorney, Agent, or Firm*—Fisher, Christen & Sabol

[57] ABSTRACT

Reactive calcium oxide is produced on an industrial scale by decomposing calcium carbonate having a grain size of less than 200 μm at a temperature of at least 850° C and at a $CO_2$—partial pressure of not more than 40% of the $CO_2$—equilibrium pressure corresponding to the formation of the reactive calcium oxide.

6 Claims, 1 Drawing Figure

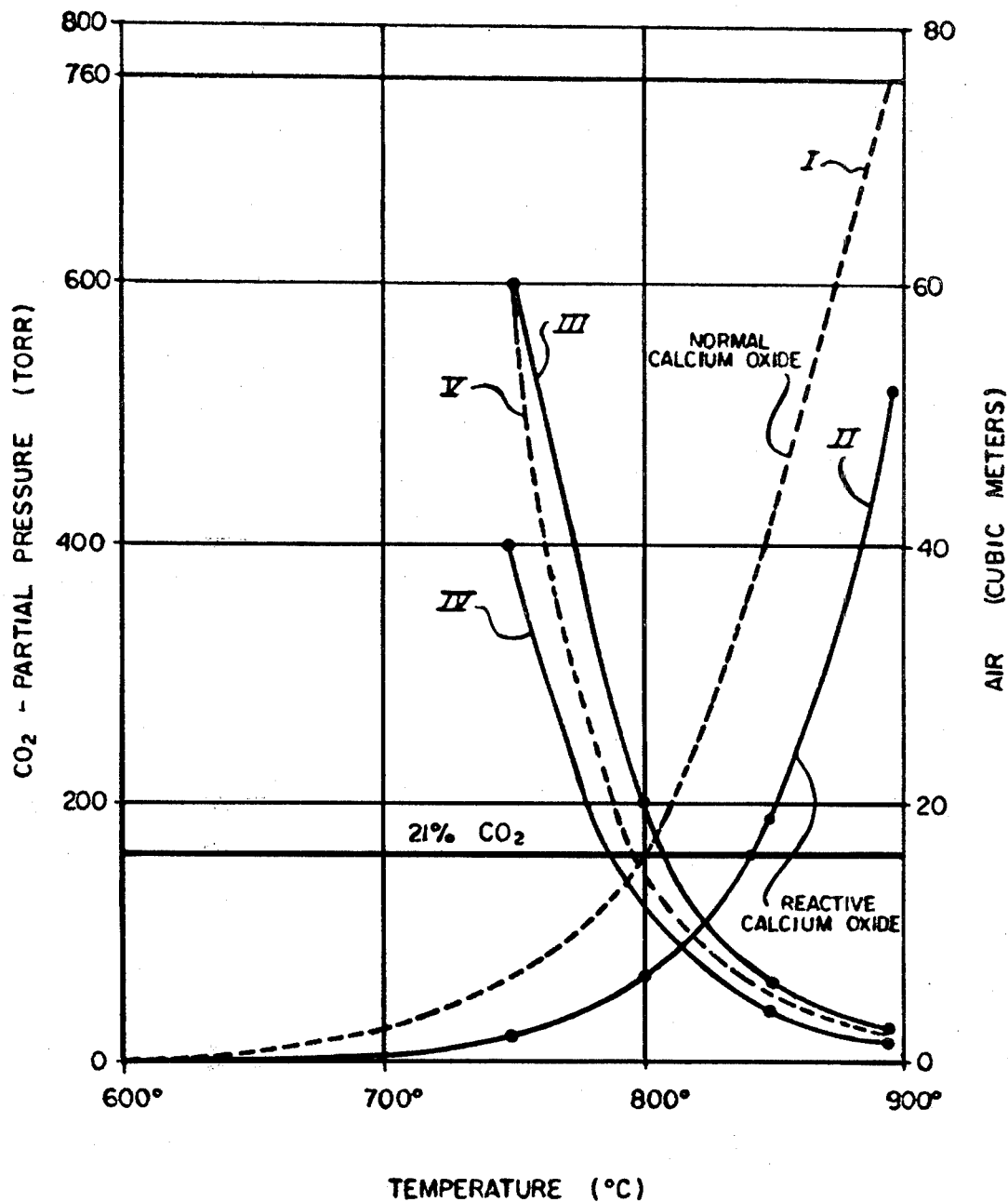

PROCESS FOR THE PRODUCTION OF REACTIVE CALCIUM OXIDE

This is a continuation of application Ser. No. 144,454, filed May 18, 1971, and now abandoned.

The present invention relates to the production of extremely reactive calcium oxide. More particularly, the present invention relates to the production of such extremely reactive calcium oxide by the decomposition of calcium carbonate under closely controlled reaction conditions.

It is known that during the decomposition of synthetic or natural calcium carbonate (Ca $CO_3$) into calcium oxide (CaO) and carbon dioxide ($CO_2$) the calcium oxide builds up a new crystal structure. It is also known that during this process intermediate structures with lattice defects are formed, in which the arrangement of the calcium ions and of the oxygen ions is highly disturbed. This intermediate calcium oxide with a disturbed lattice will be hereinafter described as reactive calcium oxide.

This reactive calcium oxide is obtained at a temperature of 750° C in from 5 to 15 minutes after the temperature is reached, at a temperature of 800° C in from 1 to 3 minutes after the temperature is reached, and at a temperature of 900° in only a few seconds after the temperature is reached. Subsequently the conversion into the practically ordered crystal structure of normal calcium oxide begins and, according to the temperature the conversion will take from several minutes to several hours. Due to its numerous lattice defects this reactive calcium oxide has a higher heat of solution than does normal calcium oxide which, according to the degree of the defects, can amount to 2000 cal/mol. and more, above the value of normal calcium oxide. Thus, the reactive calcium oxide has an excess-energy $\Delta E$ whose value depends upon the holding time and the applied temperature of decomposition. Due to this excess-energy such a reactive calcium oxide is considerably more reactive than the normal compound.

Although in the past there have been many efforts to increase the reactivity of calcium oxide, and although such an extremely reactive calcium oxide has provided many new fields of application, it has been possible up to the present to produce such a reactive calcium oxide on an industrial scale.

It is therefore an object of the present invention to provide a process for the production of reactive calcium oxide.

It is another object of the present invention to provide such a process which is operable on an industrial scale.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description and the accompanying drawing which shows air quantities required to produce 1 kg. of normal and reactive calcium oxide at varying temperatures.

Surprisingly, it has been found that an extremely reactive calcium oxide can be produced by decomposing calcium carbonate having a grain size of less than 200 $\mu$m at a temperature of at least 850° C. The amount of heat required for the deacidification is delivered in quantity to the calcium carbonate in the finely divided condition, and the process of decomposition is carried out at a $CO_2$-partial pressure which, at most, amounts to 40% of the $CO_2$-equilibrium pressure corresponding to the formation of the reactive calcium oxide. In addition, during the decomposition process the holding periods are kept as short as possible.

This heat delivery in quantity can be accomplished, for example, by quickly feeding the finely divided calcium carbonate through a fluid bed of a granular heat carrier medium, or during transport through a narrow heating chamber according to the suspension gas method. The heat delivery in quantity to the calcium carbonate must take place at the latest when the calcium carbonate has reached a temperature of 750° C. The process is carried out according to the diagram of the drawing (as soon as the temperature of the material has reached and surpassed 850° C) with a $CO_2$-partial pressure of, at most, 40% of the $CO_2$-decomposition pressure corresponding to the formation of the reactive calcium oxide, whereby the material to be burned is exposed to the quantitative heat effect, beginning at 850° C for a short time and decreasing at 900° C. to a few seconds, after which it is quickly cooled, preferably to a temperature below 750° C. It has been found to be particularly suitable to burn at a $CO_2$-partial pressure which amounts to less than 20% of the decomposition pressure corresponding to the formation of the reactive calcium oxide.

The diagram in the drawing shows in curve I the dependence of the $CO_2$-decomposition pressure of calcium carbonate upon the temperature for normal clacium oxide and in curve II the corresponding dependence for the reactive calcium oxide, calculated from measured $\Delta E$ values. A comparison of these two curves indicates that the same $CO_2$-decomposition pressure is reached during the formation of reactive calcium oxide at temperatures which are considerably higher than the temperature of formation of normal calcium oxide. In other words, at equal temperatures, the $CO_2$-equilibrium pressure of the system $CaCO_3$-reactive CaO is much lower than that of the system with normal CaO.

Usually, the heat required for the deacidification of the calcium carbonate is produced by the direct burning of a fuel such as coke. Utilizing stoichiometrical amounts of air (air factor 1) this results in a heating gas containing approximately 21% of $CO_2$, corresponding to a $CO_2$-partial pressure of 160 Torr, which is shown as a horizontal line in the drawing. This indicates that in conventional lime burning furnaces, and considering curve I, a deacidification cannot occur below 800° C, and also that in such furnaces a formation of reactive calcium oxide below 800° C is not possible. Thus, if reactive calcium oxide is to be produced with a sufficient reacton speed, the $CO_2$-partial pressure of the atmosphere must be, according to the present invention, considerably below the equilibrium pressure of the system $CaCO_3$-reactive CaO.

The following calculation shows the amount of air which is necessary to produce 1 kg. of reactive CaO by decomposing $CaCO_3$ at different temperatures: When burning 1 kg, $CaCO_3$, 0.78 kg. $CO_2$ are obtained, corresponding to 0.4 $Nm^3$ (normal cubic meters). If the decomposition is to be attained at a material temperature of 750° C, corresponding to a $CO_2$-equilibrium pressure of 20 Torr for reactive CaO, and the outgoing air is calculated to have a $CO_2$-content of 25%, that is 5 Torr, it is seen that 60 $Nm^3$ of air are required for this 1 kg. of CaO. If it were possible to load the outgoing gas with 40% of the equilibrium pressure, that is with 8 Torr, there still would be approximately 40 $Nm^3$ of air required. The temperature of this air should be at least about 800° C.

Similar calculations for material temperatures of 800°, 850° and 900° C result in the curves III and IV ascending to the left in the drawing. According to these curves, for a decomposition at 800° C, 20 and 13 $Nm^3$, respectively, of air are required, whereas at 850° C., 6 and 4 $Nm^3$, respectively, of air are required, and at 900° C., 2.3 and 1.5 $Nm^3$, respectively, of air are required. Since it is known that the reaction speed of the decomposition reaction greatly decreases with decreasing temperature, the curve of the amount of air needed will therefore be located between the two calculated curves, so that the required air at 750° C will probably be nearer to 60 $Nm^3$ and at 900° C nearer to 1.5 $Nm^3$. This is shown in the drawing as curve V.

Since the high air quantities needed when burning below 850° C reduce the efficiency of the burning process and, with respect to obtaining a high quality product, since the exhaust losses at these temperatures are extremely high, it is preferable to burn above 850° C. and even more preferable to burn about 875° C. Therefore it is convenient to work between 875° and 900° C and to carry out the burning process in quantity, according to the abovementioned fluid bed method or suspension gas method. The calcium carbonate is used in granular form with a grain size below 200 μm, preferably below 100 μm, and is removed from the heating zone immediately after the deacidification has occurred, and separated for example in a cyclone. The required quantity of air should have a temperature of at least 900° C and the heat carrier medium in the fluid bed or the walls of the chamber in the suspension gas method should have at least the same temperature, to increase the heat supply.

It will be understood that during the burning of natural limestone the degree of impurities must be taken into consideration, since they may influence the $CO_2$-partial pressure during the decompositon as well as the permissible holding periods at the decomposition temperature.

Since the reactive calcium oxide combines very quickly and tightly with water vapor, it is apparent that the carrier air is to be used in a dry condition. In addition, the burned material should be kept free from moisture and carbon dioxide during the cooling thereof.

The produced reactive calcium oxide which, for the first time, can be obtained in industrial quantities according to the present invention, is so reactive that when it contacts water it becomes explosively hydrated. It represents a valuable product in both inorganic and organic chemistry, and opens ways to new syntheses due to its enormous reactivity. For example, the reactive calcium oxide of the present invention may be used for drying gases and organic liquids; it reacts more mildly than $P_2O_5$ or concentrated sulfuric acid.

The granular heat carrier medium used in the fluid bed method should not react with basic materials during the heating. Useful therefore are basic and neutral materials and compounds with sufficient heat resistance, e.g. sintered calcium oxide, sintered magnesium oxide and sintered dolomite or corundum. The particles may conveniently have a size within the range of 0.5 to 2 mm.

What is claimed is:

1. A process for the production of extremely reactive calcium oxide which comprises decomposing calcium carbonate having a grain size of not more than 200 microns at a material temperature of at least 850° C., and said decomposition being carried out at a $CO_2$-partial pressure which amounts to not more than 40% of the $CO_2$-equilibrium pressure corresponding to the formation of reactive calcium oxide at the decomposition temperature according to the drawing.

2. The process as defined in claim 1 wherein the decomposition is carried out at a $CO_2$-partial pressure which amounts to not more than 20% of said $CO_2$-equilibrium pressure.

3. The process as defined in claim 1 wherein the decomposition is carried out at a material temperature of at least 875° C.

4. The process as defined in claim 1 wherein the calcium carbonate has a grain size below 100 microns.

5. The process as defined in claim 1 wherein the decomposition is conducted in a fluid bed containing a granular heat carrier medium.

6. The process as defined in claim 1 wherein the produced reactive calcium oxide is immediately cooled to a temperature below 750° C.

* * * * *